United States Patent
Xu (10) Patent No.: US 8,795,904 B2
(45) Date of Patent: Aug. 5, 2014

(54) NONAQUEOUS ELECTROLYTE SOLVENTS AND ADDITIVES

(75) Inventor: Kang Conrad Xu, North Potomac, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 746 days.

(21) Appl. No.: 12/987,241

(22) Filed: Jan. 10, 2011

(65) Prior Publication Data

US 2011/0281177 A1    Nov. 17, 2011

Related U.S. Application Data (60) Provisional application No. 61/334,265, filed on May 13, 2010.

(51) Int. Cl.
  *H01M 10/02*      (2006.01)
(52) U.S. Cl.
  USPC .......... 429/340; 429/324; 429/326; 429/330; 429/336; 429/338
(58) Field of Classification Search
  USPC ................................. 429/324–346
  See application file for complete search history.

(56) References Cited

U.S. PATENT DOCUMENTS

| | | | |
|---|---|---|---|
| 4,894,302 A | 1/1990 | Hoffman et al. | |
| 5,021,308 A | 6/1991 | Armand et al. | |
| 5,750,284 A | 5/1998 | Pendalwar et al. | |
| 5,753,389 A | 5/1998 | Gan et al. | |
| 5,824,433 A | 10/1998 | Angell et al. | |
| 5,908,717 A | 6/1999 | Pendalwar et al. | |
| 6,010,806 A | 1/2000 | Yokoyama et al. | |
| 6,022,643 A | 2/2000 | Lee et al. | |
| 6,316,141 B1 | 11/2001 | Aurbach et al. | |
| 6,492,064 B1 | 12/2002 | Smart et al. | |

(Continued)

FOREIGN PATENT DOCUMENTS

| | | |
|---|---|---|
| JP | 2001-256995 A | 9/2001 |
| JP | 2002-124297 A | 4/2002 |

(Continued)

OTHER PUBLICATIONS

Machine English Translation of JP-2009-123499 to Kawashima.*

(Continued)

*Primary Examiner* — Milton I Cano
*Assistant Examiner* — Michael Dignan
(74) *Attorney, Agent, or Firm* — John H. Raubitschek

(57) ABSTRACT

A series of polar and aprotic organic molecules, which, when used as solvents or additives in nonaqueous electrolytes, afford improved performance for electrochemical cells that operate at high voltages. These polar and aprotic solvents or additives may contain at least one unsaturated functionality per molecule. The unsaturated functionality is conjugated with the polar functionality of the molecule. The unsaturated functionality that is either a double or triple bond could be between carbon-carbon, or between carbon-heteroatom, or between hetroatom-heteroatom. Nonaqueous electrolyte solutions are provided comprising one or more lithium salts dissolved in the mixture solvents, which comprises, in all possible ratios, at least one of the polar, aprotic and unsaturated solvent or additives, one or more cyclic carbonic diesters such as ethylene carbonate, and one or more acyclic carbonic diesters such as dimethyl carbonate, diethyl carbonate, and ethylmethyl carbonate.

26 Claims, 6 Drawing Sheets

(1)

(2)

(56) References Cited

U.S. PATENT DOCUMENTS

| | | |
|---|---|---|
| 6,924,061 B1 | 8/2005 | Jow et al. |
| 6,939,647 B1 | 9/2005 | Jow et al. |
| 7,087,349 B2 | 8/2006 | Kim et al. |
| 7,255,965 B2 | 8/2007 | Xu et al. |
| 7,311,993 B2 | 12/2007 | Ivanov et al. |
| 7,348,103 B2 | 3/2008 | Ivanov et al. |
| 7,582,389 B2 | 9/2009 | Matsui et al. |
| 7,718,319 B2 | 5/2010 | Manthiram et al. |
| 7,754,380 B2 | 7/2010 | Abe et al. |
| 2006/0172201 A1 | 8/2006 | Yasukawa et al. |
| 2006/0210883 A1 | 9/2006 | Chen et al. |
| 2007/0042271 A1 | 2/2007 | Nishida et al. |
| 2007/0207389 A1 | 9/2007 | Hamamoto et al. |
| 2007/0218364 A1 | 9/2007 | Whitacre et al. |
| 2007/0218370 A1* | 9/2007 | Deguchi et al. ............... 429/306 |
| 2007/0224514 A1 | 9/2007 | Kotato et al. |
| 2007/0243463 A1 | 10/2007 | Matsui et al. |
| 2008/0102377 A1 | 5/2008 | Abe et al. |
| 2009/0053598 A1* | 2/2009 | Abe et al. ...................... 429/199 |
| 2009/0291368 A1 | 11/2009 | Newman et al. |
| 2010/0040954 A1 | 2/2010 | Amine et al. |
| 2010/0129721 A1 | 5/2010 | Xu et al. |
| 2010/0183925 A1 | 7/2010 | Manthiram et al. |
| 2011/0136019 A1 | 6/2011 | Amiruddin et al. |
| 2011/0189548 A1 | 8/2011 | Xu |
| 2012/0009485 A1 | 1/2012 | Xu et al. |
| 2012/0225359 A1 | 9/2012 | Xu et al. |
| 2013/0115529 A1 | 5/2013 | Zhang et al. |

FOREIGN PATENT DOCUMENTS

| | | | |
|---|---|---|---|
| JP | 2002-352851 A | 12/2002 | |
| JP | 2003-059529 A | 2/2003 | |
| JP | 2003-272700 A | 9/2003 | |
| JP | 2003-272701 A | 9/2003 | |
| JP | 2003-297423 A | 10/2003 | |
| JP | 2004-071245 A | 3/2004 | |
| JP | 2008-004349 A | 1/2008 | |
| JP | 2009-123499 * | 6/2009 | ............ H01M 10/36 |
| WO | 2006/030624 | 3/2006 | |
| WO | 2006/077763 A1 | 7/2006 | |

OTHER PUBLICATIONS

Koji Abe et al., "Triple-Bonded Compound as an Additive for Negative Electrode," J. Electrochem Soc., vol. 154, A 810-815 (2007).

K. Xu et al., "High Anodic Stability of a New Electrolyte Solvent: Unsymmetric Noncyclic Alaphatic Sulfone," J Electrochem Soc., vol. 145, L 70-72 (1998).

Kang Xu et al., "Sulfone-Based Electrolytes for Lithium-Ion Batteries," J. Electrochem Soc., vol. 149, A 920-926 (2002).

March, J., Advanced Organic Chemistry—Reactions, Mechanisms, and Structure, Third Edition, Chapter 5, pp. 144, 150-151 (1985)—(Publisher: John Wiley & Sons).

"Methyl vinyl sulfone," Sigma-Aldrich on-line catalog (Copyright 2013)—http://www.sigmaaldrich.com/catalog/product/aldrich/247197.

"Allyl methyl sulfone," Sigma-Aldrich on-line catalog (Copyright 2013)—http://www.sigmaaldrich.com/catalog/product/aldrich/718203.

"3-(Methylsulfonyl)-1-propyne," Sigma-Aldrich on-line catalog (Copyright 2013)—http://www.sigmaaldrich.com/catalog/product/aldrich/718319.

"Divinyl sulfone," Sigma-Aldrich on-line catalog (Copyright 2013)—http://www.sigmaaldrich.com/catalog/product/aldrich/v3700.

"Ethyl vinyl sulfone," Sigma-Aldrich on-line catalog (Copyright 2013)—http://www.sigmaaldrich.com/catalog/product/aldrich/282839.

Xu, "Nonaqueous Liquid Electrolytes for Lithium-Based Rechargeable Batteries," Chem. Rev. (2004), 104, pp. 4303-4417—(due to document size, reference submitted in 3 parts (1 of 3, 2 or 3 and 3 of 3 parts).

U.S. Appl. No. 14/028,559 (Arthur von Wald Cresce and Kang Conrad Xu), "Electrolyte Additives in Support of Five Volt Lithium Chemistry," filed Sep. 17, 2013.

U.S. Appl. No. 14/027,268 (Arthur von Wald Cresce and Kang Conrad Xu), "Oxirane-Based Additives in Support of Five Volt Lithium Ion Chemistry," filed Sep. 16, 2013.

J. Liu et al., Kinetics Study of the 5V Spinel Cathode LiMn1.5Ni0.5O4 Before and After Surface Modifications, Journal of the Electrochemical Society, 156(11), pp. A833-A838 (2009).

J. Liu et al., Improved Electrochemical Performance of the 5V Spinel Cathode LiMn1.5Ni0.42Zn0.08O4 by Surface Modification, Journal of The Electrochemical Society, 156(1), pp. A66-A72 (2009).

K. Amine et al., Preparation and electrochemical investigation of $LiMn_2-xMe_xO_4$ (Me: Ni, Fe, and x = 0.5, 1) cathode materials for secondary lithium batteries, Journal of Power Sources 68, pp. 604-608 (1997).

Cresce et al., "Electrolyte Additive in Support of 5 V Li Ion Chemistry," Journal of the Electrochemical Society, 158(3) A337-A342 (2011).

* cited by examiner

| Salt Concentration (M) | Solvent Ratio (by Weight) | Additive Concentration (by Weight) |
|---|---|---|
| LiPF$_6$ 1.0 m | Methylallyl Sulfone | None |
| LiPF$_6$ 1.0 m | Ethylene Carbonate/Methylallyl Sulfone (50:50) | None |
| LiPF$_6$ 1.0 m | Methylallyl Sulfone/Dimethyl Carbonate (50:50) | None |
| LiPF$_6$ 1.0 m | Ethylene Carbonate/Dimethyl Carbonate/ Methylallyl Sulfone (33:33:33) | None |
| LiPF$_6$ 1.0 m | Methylpropargyl Sulfone | None |
| LiPF$_6$ 1.0 m | Methylpropargyl Sulfone/Dimethyl Carbonate (50:50) | None |
| LiPF$_6$ 1.0 m | Ethylene Carbonate/Dimethyl Carbonate (50:50) | Carbon Suboxide 5% |
| LiPF$_6$ 1.0 m | Ethylene Carbonate/Dimethyl Carbonate (50:50) | Methylpropargyl Sulfone 8% |
| NEt$_4$PF$_6$ 1.0 m | Methylallyl Sulfone/Dimethyl Carbonate (50:50) | None |
| NEt$_4$PF$_6$ 1.0 m | Ethylene Carbonate/Dimethyl Carbonate (50:50) | Methylpropargyl Sulfone 8% |

NONAQUEOUS ELECTROLYTE SOLVENTS AND ADDITIVES

CROSS REFERENCE TO RELATED APPLICATION

This application claims the benefit of U.S. Provisional Patent Application No. 61/334,265 filed on May 13, 2010, the complete disclosure of which, in its entirety, is herein incorporated by reference.

GOVERNMENT INTEREST

The invention was made in a U.S. Army laboratory and so the embodiments described herein may be manufactured, used, sold, imported and/or licensed by or for the United States Government without the payment of royalties thereon.

BACKGROUND

1. Technical Field

The embodiments herein generally relate to nonaqueous electrolytes that support the operation of electrochemical devices with high cell voltages, and more particularly, to the solvents and additives that form the nonaqueous electrolytes and can stably support the cell chemistry of the electrochemical devices with high cell voltages.

2. Description of the Related Art

The electrochemical devices that output high cell voltages utilize nonaqueous and aprotic solvents to dissolve the conducting salts, because these solvents are able to afford the stability against the oxidative or reductive reactions incurred by electrode surfaces of extreme potentials. Because the electrolyte components are almost never thermodynamically stable on the strongly reductive surfaces of anode or strongly oxidative surfaces of cathode, the electrochemical stability is rather attained through the passivation of the electrode surfaces. The above passivation is realized by the initial decompositions of solvents in trace amount and the concomitant deposition of these decomposition products which deactivate the catalytic sites of the electrode surfaces. Generally, all electrochemical devices that produce cell voltages higher than 3.0 V, and particularly in lithium-based battery chemistries, certain solvents were developed in the conventional solutions so that their decomposition products on anode and cathode surfaces are able to form dense and protective passivation layers. These solvents include ethylene carbonate (EC), vinylene carbonate (VC), and other polar and aprotic solvents and/or additives, and have become indispensable components in commercial Li ion batteries. In other words, the conventional Li ion batteries operate at high voltages (3-5 V), which were made possible by the passivation film formed on the surfaces of the anode and/or cathode. While providing protection, the film also presents resistance to the kinetics of the cell chemistry, rendering poor power density as well as poor low temperature performances.

However, the passivation layers formed by the above-described solvents and/or additives in conventional electrolytes also constitute the most resistive component in the electrochemical cells, which not only compromises the cell performances at low temperatures but also impose the kinetic restrictions on the power density of the devices at room temperature.

Furthermore, as the battery chemistries of higher energy density are being pursued, cathode materials of higher potentials become focus of research efforts, and the passivation layer formed by these solvents or additives of the conventional solutions can no longer ensure the stable operation of the cell chemistry.

SUMMARY

In view of the foregoing, an embodiment herein provides an electrochemical device comprising a negative electrode of a metal and an electrode active material that reversibly intercalates and de-intercalates cations; a positive electrode comprising an electrode active material that reversibly intercalates and de-intercalates any of cations and anions; a barrier comprising any of a porous polyolefin separator and a gellable polymer film separating the negative electrode from the positive electrode; and a nonaqueous electrolyte contacting the negative electrode and the positive electrode, the nonaqueous electrolyte comprising at least one unsaturated molecule acting as a solvent or an additive and comprising any of the following structures (1) through (8):

(1)

(2)

(3)

(4)

(5)

(6)

(7)

(8)

wherein i, j, and k are integers independent from each other and range from 0 to 1, and l, m, and n are integers independent from each other and range from 0 to 2, respectively, wherein $R^{1-3}$ are saturated substituents comprising hydrogen, C1-C10 normal or C3-C10 branched alkyls, halogen radicals, alkoxyls, thioalkoxyls, aromatic radicals, and unsaturated substituents comprising any of the radicals in the following structures (9) through (11):

(9)

(10)

(11)

wherein $R^{4-6}$ are selected from any of H radical, C1-C10 normal or C3-C10 branched alkyls, halogen radicals, alkoxyls, thioalkoxyls, and aromatic radicals.

The nonaqueous electrolyte may comprise at least one of the $R^{1-3}$ substituents selected from the structures (9) through (11). Additionally, the nonaqueous electrolyte may comprise one of the structures (1), (2), (3), (4), (5), (6), or (7), and wherein at least one of l, m, and n equals zero. Furthermore, the nonaqueous electrolyte may comprise only structure (1), wherein X comprises sulfonyl, and wherein one of i or j equals zero. Moreover, the nonaqueous electrolyte may comprise one of the structures (1) or (2), wherein X comprises sulfonyl, carbonyl, thionyl or phosphoryl, wherein i, j, k, l, m, and n equal zero, and wherein at least one of $R^{1-3}$ is selected from radicals comprising any of structures (9) through (11). Also, the nonaqueous electrolyte may comprise a solvent containing at least one unsaturated molecule. Furthermore, the nonaqueous electrolyte may comprise a co-solvent containing any of cyclic and acyclic carbonates and carboxylic esters containing any of ethylene carbonate, propylene carbonate, vinyl carbonate, dimethyl carbonate, diethyl carbonate, ethylmethyl carbonate, γ-butyrolactone, methyl butyrate, ethyl butyrate, and mixtures thereof.

Alternatively, the nonaqueous electrolyte may comprise a co-solvent in mixture with at least one of the molecules of structures (1) through (8) as a co-solvent or an additive. The nonaqueous electrolyte may be a lithium salt comprising any of lithium hexafluorophosphate, lithium fluoro(perfluoroalkyl)phosphate, lithium tetrafluoroborate, lithium hexafluoroarsenate, lithium perchlorate, lithium tetrahloaluminate, lithium tris(trifluoromethanesulfonyl)methide, lithium perfluoroalkylsulfonate, lithium arylsulfonate, lithium bis(oxalato)borate, lithium difluoro(oxalato)borate, and mixtures thereof. Preferably, a concentration of the solvent ranges from approximately 10% to 100% with respect to a total solvent weight, wherein a concentration of the additive ranges from approximately 0.005% to 10% with respect to the total solvent weight, and wherein a concentration of the lithium salt ranges from approximately 0.5 to 3.0 mole/liter.

The active material of the negative electrode may comprise any of lithium metal, lithium alloys with other metals, carbonaceous materials with various degrees of graphitization, lithiated metal oxides, and chalcogenides. Also, the active material of the positive electrode may comprise any of transition metal oxides, metalphosphates, chalcogenides, and carbonaceous materials with various degree of graphitization.

Another embodiment provides an electrolyte solution and a method of forming the same comprising at least one lithium salt and a solvent system mixed with at least one lithium salt, the solvent system of a plurality of polar and aprotic organic molecules comprising at least one unsaturated functionality per molecule that is conjugated with a polar functionality of the molecule, wherein at least one unsaturated functionality comprises any of a double bond and a triple bond between any of a carbon-carbon chain, a carbon-heteroatom chain, and a hetroatom-heteroatom chain; at least one cyclic carbonic diester; and at least one acyclic carbonic diester. Preferably, the solvent system comprises any of the structures (1) through (8):

(1)

(2)

(3)

(4)

(5)

(6)

(7)

(8)

wherein i, j, and k are integers independent from each other and range from 0 to 1, and l, m, and n are integers independent from each other and range from 0 to 2, respectively, wherein $R^{1-3}$ is any saturated substituents comprising hydrogen, C1-C10 normal or C3-C10 branched alkyls, halogen radicals, alkoxyls, thioalkoxyls, aromatic radicals, and unsaturated substituents comprising any of the radicals in the following structures (9) through (11):

(9)

(10)

(11)

wherein $R^{4-6}$ are selected from H radical, C1-C10 normal or C3-C10 branched alkyls, halogen radicals, alkoxyls, thioalkoxyls, or aromatic radicals.

Preferably, the solvent system comprises any of (i) a neat solvent with at least one additive, (ii) a neat solvent without an additive, (iii) a mixture of at least two solvents with at least one additive, and (iv) a mixture of at least two solvents without an additive. Furthermore, an electrolyte solution may be formed by the mixing of the solvent system with at least one lithium salt; and the electrolyte solution formed may contain any of methylallyl sulfone, methylallyl sulfonate, methylpropargyl sulfone, methylallenic sulfone, methylacetylenic sulfone, methylpropargyl sulfonate, methylacetylenic carbonate, acetylenic butyrate, thiophene-1-oxide, and carbon suboxide.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Before describing the embodiments herein in detail, it is to be understood that the terminology used herein is for the purpose of describing particular embodiments only, and is not intended to be limiting. Therefore, the following terms are defined in accordance with the embodiments herein:

The term "unsaturated functionality" refers to either double or triple bond that could be hydrogenated under catalytic conditions.

The term "polar functionality" refers to either electron-withdrawing groups such as, but not limited to, carbonyl, nitrile, sulfonyl and sulfone, or electron-donating groups such as, but not limited to, alkyl, alkoxy, thioalkoxy, phenyl, phenolic, and thiophenolic.

The term "hetero-atom" refers to non-carbon atoms that are able to form multiple bonds with carbon or among themselves, which may include, but are not limited to, sulfur, oxygen, nitrogen, and phosphorus.

The term "solvents" refers to molecular components of the electrolyte, whose concentrations are higher than 10% by weight.

The term "additives" refers to the molecular components of the electrolyte, whose concentrations are lower than 10% by weight.

The term "radicals" refers to atoms or molecules, either inorganic or organic, which have unpaired electrons.

The term "normal alkyl" refers to unbranched, saturated hydrocarbon radicals, such as methyl, ethyl, n-propyl, n-octyl and the like.

The term "branched alkyl" refers to saturated hydrocarbon radicals that contain as least one secondary or tertiary carbon designated as "branch points", such as iso-propyl, sec-butyl, iso-pentyl, and the like.

The term "skeleton" refers to the main backbone of a molecule that comprise either carbon or hetero-atoms.

The term "conjugated system" refers to a skeleton that possess alternating unsaturated bonds, so that the involved pi-electrons are delocalized.

The term "neat solvent" refers to a solvent having the following properties: anion-solvating tendency, hydrogen-bonding acidity, and electrophilicity, and cation-solvating tendency, hydrogen-bonding basicity, and nucleophilicity, respectively. Some examples of a neat solvent include, but are not limited to, deionized water or methanol.

The embodiments herein provide new electrolyte solvents or additives that enable cell chemistries of high output cell voltages. More specifically, the embodiments herein provide new solvents and additives, which, when used either as the bulk electrolyte solvents or co-solvents, or as additives in low concentrations, can form passivation layers on either or both anode and cathode surfaces, which not only are effectively protective in wide temperature range, but also are conductive and allow fast kinetics of the cell chemistry. The embodiments herein formulate electrolyte solutions utilizing the solvents and additives, and provide electrochemical devices utilizing the electrolyte solutions. The devices that can be developed deliver superior performances as compared with the state-of-the-art technologies.

The embodiments utilize one or more polar and aprotic organic compounds as either solvent or additive in the non-aqueous electrolytes. More particularly, the embodiments herein utilize as either solvent or additive in the nonaqueous electrolytes one or more polar, aprotic and unsaturated organic compounds, which contain at least one unsaturated functionality per molecule. Still more particularly, the unsaturated functionality may include, but is not limited to, an unsaturated bond between carbon-carbon, or an unsaturated bond between carbon-heteroatom, or an unsaturated bond between heteroatom-heteroatom. Still more particularly, the unsaturated functionality is located in a position that is conjugated with the polar functionality of the polar molecule.

Referring now to the drawings, and more particularly to FIGS. 1 through 5, where similar reference characters denote corresponding features consistently throughout the figures, there are shown preferred embodiments.

As a primary aspect of the embodiments herein, the new solvents or additives are constructed on the basis of the molecule structures 1 through 8, respectively shown in FIGS. 1A through 1H in which i, j, and k are integers independent from each other and range from 0 to 1, and l, m, and n are integers independent from each other and range from 0 to 2, respectively, X is a polar functionality selected from carbonyl thionyl phosphoryl or sulfonyl

Y is a polar functionality selected from phosphinyl or phosphoryl

Figure 1A:
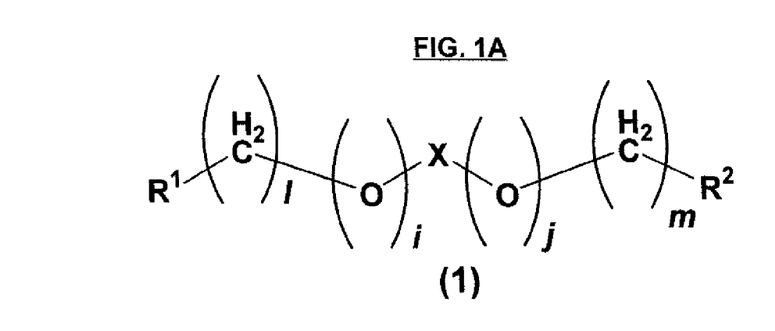
FIGS. 1A through 1K are molecular structures used in accordance with the embodiments herein.
Figure 1B:
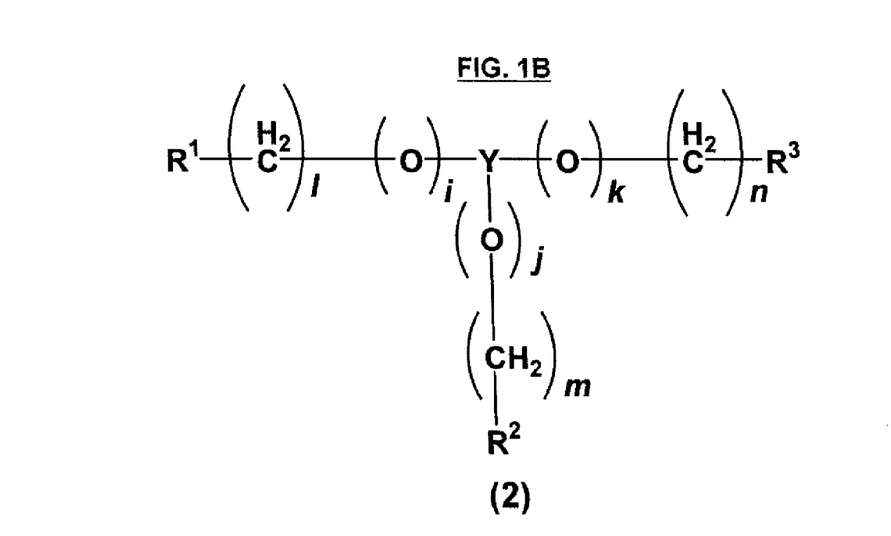
Figure 1C:
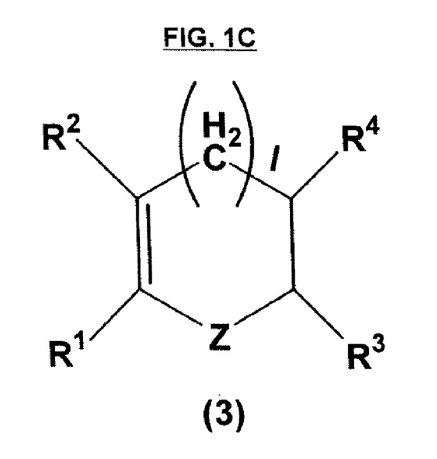
Figure 1D:
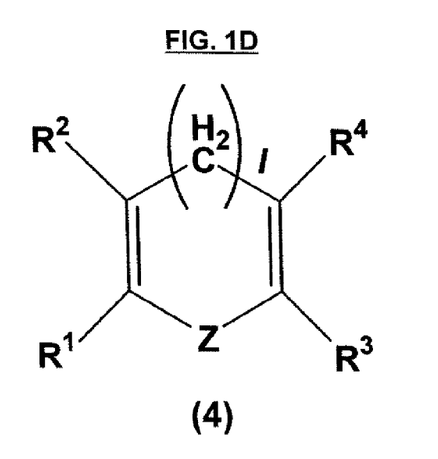
Figure 1E:
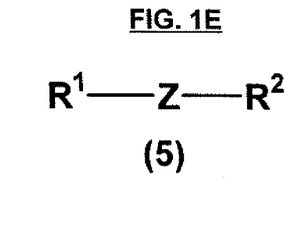
Figure 1F:
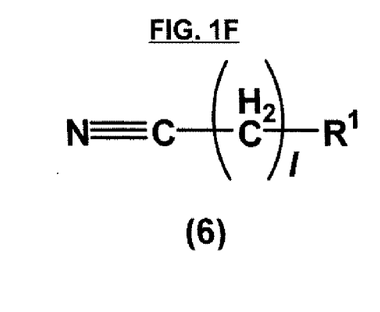
Figure 1G:
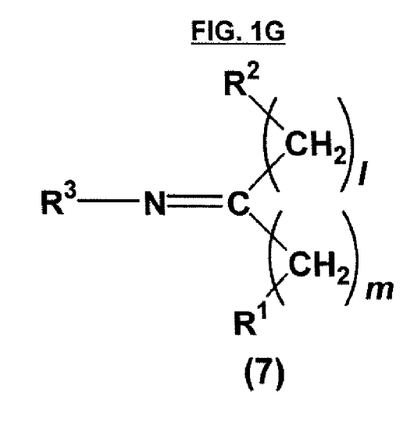
Figure 1H:
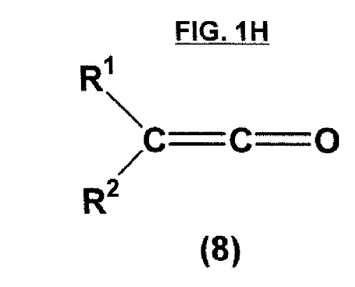
Figure 1I:
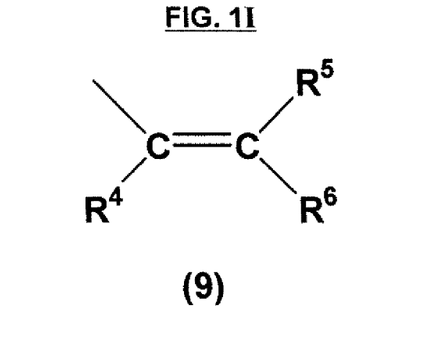
Figure 1J:
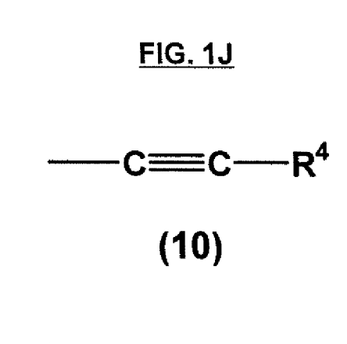
Figure 1K:
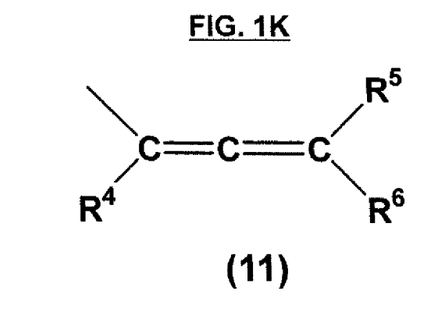

Z is a polar functionality selected from carbonyl thionyl sulfonyl mercapto (-s-), or oxy (-o-), and $R^{1-3}$ are either saturated substituents independently selected from hydrogen radicals, C1-C10 normal or C3-C10 branched alkyls, halogen radicals, alkoxyls, thioalkoxyls, or selected from the unsaturated substituents in radical structures 9-11, respectively shown in FIGS. 1I through 1K, where $R^{4-6}$ in turn are selected from hydrogen, C1-C10 normal or C3-C10 branched alkyls, halogen radicals, alkoxyls, thioalkoxyls, or aromatic radicals.

More preferentially but not intending to be limiting, the new solvents or additives of the embodiments herein are created from the structures of 1 through 8, in which at least one of $R^{1-3}$ is selected from the unsaturated substituents in structures 9-11, respectively shown in FIGS. 1I through 1K.

Still more preferentially but not intending to be limiting, in the unsaturated solvents or additives as described by structures 1-7, at least one of l, m, or n is 0, so that the unsaturated functionalities in radicals 9-11 are located on the alpha-position to the polar groups in these molecules, and that a conjugated skeleton is thus formed.

Still more preferentially but not intending to be limiting, the above described conjugated system could be either electron-deficient or electron-rich. More specifically, the polar functionality that conjugates with the unsaturated functionalities could be either electron-pulling or electron-pushing. The former includes, but is not limited to, carbonyl, nitrile, sulfonyl and sulfone. The latter includes, but is not limited to, alkyl, alkoxy, thioalkoxy, phenyl, phenolic, and thiophenolic.

Still more particularly, the unsaturated functionalities in the solvents include, but are not limited to, carbon-carbon double bonds, carbon-carbon triple bonds, carbon-nitrogen double bonds, and carbon-nitrogen triple bonds, and other unsaturated bonds between carbon and other hetero-atoms, wherever possible.

In still further aspects of the embodiments herein, the electrolyte solutions are prepared by using the solvents or additives selected from structures 1 through 8 by following the procedures that can be readily performed by one of ordinary skill in the art.

In yet further aspects of the embodiments herein, electrochemical devices that operate with high cell voltages are fabricated based on the electrolyte solutions as prepared above. These devices include, but are not limited to, (1) lithium and lithium ion cells that use lithiated transition metal oxides or lithiated olivine metalphosphate as cathode, and lithium metal, lithium alloys, metal oxides or sulfides, carbonaceous materials as anode; (2) dual intercalation cells in which both cation and anion intercalate simultaneously into lattices of anode and cathode materials, respectively; (3) electrochemical double layer capacitors based on various electrode materials of high surface area; and (4) electrolysis cells that produce chemical species at extreme potentials.

The above cells are assembled according to the procedures that can be readily performed by one of ordinary skill in the art. These electrochemical devices containing the co-solvents or additives disclosed in the embodiments herein can provide improved performance.

Having described the embodiments herein, the following examples are given to illustrate specific applications of the embodiments herein. They are intended to provide those of ordinary skills in the art with a complete disclosure and description of how to make and use the novel solvents and additives of the embodiments herein. These specific examples are not intended to limit the scope of the embodiments herein described in this application.

EXAMPLE 1

Synthesis of Methylallyl Sulfone

To a flask containing 304.50 g thiourea suspended in 500 mL water, 190.36 g dimethylsulfate is added dropwise under stirring. Upon completion of addition, the solution is heated to reflux, and then 320 g NaOH dissolved in 500 mL water is gradually added. Under vehement stirring 484 g allylbromide is added dropwise. The organic phase of the reactant is separated and then added dropwise to a mixture of 810 g 30% hydrogen peroxide and 1200 g glacier acetic acid with effective cooling and stirring. The resultant reactant, after being concentrated to 50% of the original volume by evaporation, is subject to multiple extractions with chloroform. The combined extractions are subject to evaporation to remove chloroform. Following drying the crude product over activated molecular sieves, the solvent methylallyl sulfone is obtained at 80% yield through distillation.

EXAMPLE 2

Synthesis of Methylallyl Sulfonate 114.55 g methylsulfonyl chloride is added dropwise to a mixture of 58.08 g allyl alcohol and 101.2 g triethylamine dissolved in 500 mL dichloromethane. Upon filtering, the organic phase is subject to drying and distillation, which yields the solvent at 80% yield.

EXAMPLE 3

Synthesis of Methylpropargyl Sulfone

To a flask containing 30.45 g thiourea suspended in 100 mL water, 19.036 g dimethylsulfate is added dropwise under stirring. Upon completion of addition, the solution is heated to reflux, and then 32 g NaOH dissolved in 50 mL water is gradually added. Under vehement stirring, 95.20 g propargyl bromide solution in xylene is added dropwise. The organic phase of the reactant is then separated and added to a mixture of 81 g 30% hydrogen peroxide and 120 g glacier acetic acid with effective cooling and stirring. Following the similar purification procedure as described in Example 1, the solvent methylpropargyl sulfone is obtained in 80% yield.

EXAMPLE 4

Synthesis of Methylallenic Sulfone 56.06 g dry propargyl alcohol and 101.20 g triethylamine are dissolved in 1.0 L dry dichloromethane and is then cooled by liquid nitrogen. A solution of 37.10 g methylsulfenyl chloride in 300 mL dichloromethane is added dropwise under stirring. When the temperature rises to −20° C., the salt is filtered away and then rinsed with dichloromethane. The residue is subject to vacuum evaporation. The remaining organic phase is added to a mixture of 88 g 30% hydrogen peroxide and 110 g glacier acetic acid with effective cooling and stirring. Following the similar purification procedure as described in Example 1, the solvent methylallenic sulfone is obtained in 40% yield.

EXAMPLE 5

Synthesis of Methylacetylenic Sulfone 48.11 g methane thiol dissolved in 100 mL dioxlane with 20% KOH is sealed in an autoclave at −10° C. Acetylene gas is then introduced at room temperature through a valve, whose pressure is maintained at approximately 100 psi. The autoclave is heated to approximately 120° C. under stirring. During the interval, additional acetylene gas is introduced until the pressure stopped decreasing. After evaporation of the volatile fractions, the reactant is cooled down to −20° C. and then treated with excess liquid bromine under stirring. The oily phase is then subject to dehydrobromination in the presence of triethylamine and powdered potassium hydroxide under vacuum. The brown oily product is added dropwise to a mixture of 200 g 30% hydrogen peroxide and 300 g glacier acetic acid. Following the similar purification procedure as described in Example 1, the solvent methylacetylenic sulfone is obtained at moderate yield.

EXAMPLE 6

Synthesis of Methylpropargyl Sulfonate 114.55 g methylsulfonyl chloride is added dropwise to a mixture of 56.06 g propargyl alcohol and 101.2 g triethylamine dissolved in 500 mL dichloromethane. Following a similar purification procedure as described in Example 2, the solvent is obtained at 80% yield.

EXAMPLE 7

Synthesis of Methylacetylenic Carbonate 94.5 g methylchloroformate is added dropwise to a mixture of 114.96 g 2,2-dichloroethanol, 79.10 g pyridine and 200 mL chloroform at 0-5° C. under stirring. Further stirring at room temperature overnight is followed by pouring the reactant over ice, the resultant mixture of which is subsequently neutralized by adding 6 M hydrogen chloride until the pH reaches 2.0. The organic phase is then separated and then subjected to dehydrobromination with dry ethoxide. After filtration, the organic phase is subjected to distillation, which yields the solvent methylacetylenic carbonate at 50% yield.

EXAMPLE 8

Synthesis of Acetylenic Butyrate 106.55 g butyryl chloride is added dropwise to a mixture of 114.96 g 2,2-dichloroethanol, 101.2 g triethylamine and 500 mL dichloromethane at 0-5° C. under stirring. Following a similar purification procedure as described in Example 7, the solvent acetylenic butyrate is obtained at moderate yield.

EXAMPLE 9

Synthesis of Thiophene-1-Oxide 84.14 g thiophene dissolved in 200 mL dry acetone is added dropwise to 103 g 30% hydrogen peroxide under stirring and cooling at 0-5° C. Upon completion of addition, the reactant is left standing at room temperature overnight. After the solvent is removed under vacuum, the solvent thiophene-1-oxide is obtained through distillation at a yield of 70%.

EXAMPLE 10

Synthesis of Carbon Suboxide 104.1 g malonic acid and 300 g phosphorus pentoxide are finely ground and mixed under anhydrous condition. The reactant mixture is heated up to 200° C. The solvent carbon suboxide is collected in a glass receiver at −10° C. with good yield.

EXAMPLE 11

Preparation of Novel Electrolyte Solutions

This example summarizes a general procedure for the preparation of electrolyte solutions comprising the novel solvents or additives, whose synthesis has been disclosed in Examples 1 through 10. Both the concentration of the lithium salts and the relative ratios between the solvents or additives can be varied according to individual needs.

The electrolyte solution is prepared under a moisture-free environment to have the following composition: one lithium salt or the mixture of lithium salts, and a solvent system that either comprises a neat solvent with or without one or more additives, or mixtures of two or more solvents with or without additives.

The lithium salts selected include, but are not limited to, lithium hexafluorophosphate, lithium hexafluoroarsenate, lithium tetrafluoroborate, lithium perfluoroalkylfluorophosphate, lithium perfluoroalkylfluoroborate, lithium bis(trifluoromethanesulfonyl)imide, lithium bis(perfluoroethanesulfonyl)imide, lithium bis(oxalato)borate, and lithium (difluorooxalato)borate.

The solvents or additives are selected from the solvents or additives that are provided by the embodiments herein and the commonly-used nonaqueous electrolyte solvents, which include, but are not limited to, cyclic or acyclic carboxylic esters, such as ethyl acetate and gamma-butyrolactone, cyclic or acylic diesters of carbonic acids, such as ethylene carbonate and dimethyl carbonate, nitriles such as acetonitrile and 3-(2,2,2-trifluoroethoxy)propionitrile, or the mixtures thereof. The resultant electrolyte solution contains at least one of those solvents or additives that are provided by the embodiments herein and are as described in structures 1 through 8 (FIGS. 1A through 1H).

The solvent or solvent mixtures with or without the additives are weighed and mixed according to specific ratios, then the lithium salt or mixture of lithium salts are weighed and dissolved in the above solvent or solvent mixtures.

Figure 2:
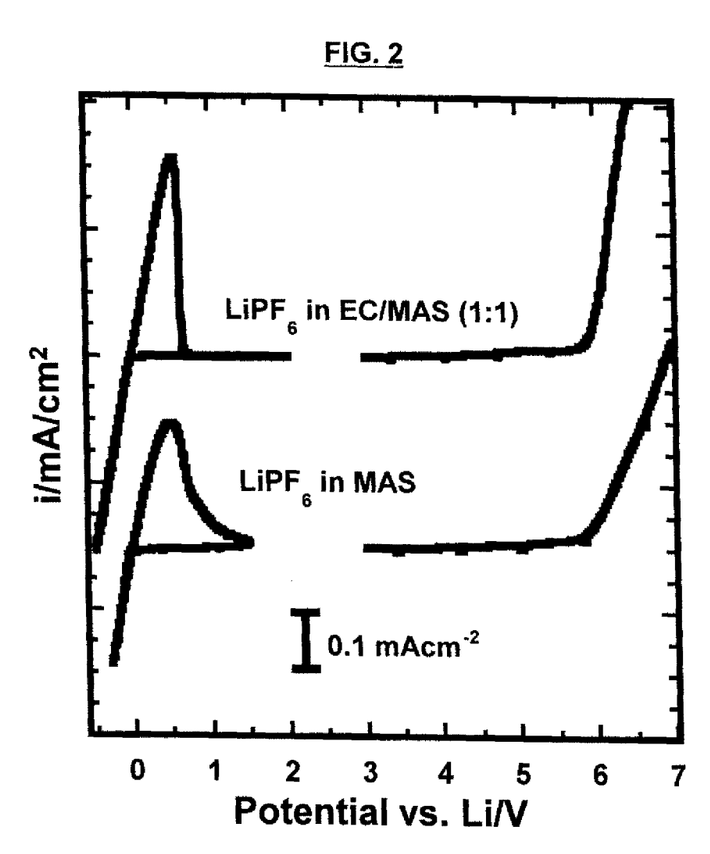
FIG. 2 is a graphical representation illustrating a cyclic voltametry of a Pt working electrode measured in various electrolyte solvents according to the embodiments herein.

With purpose of illustration only, FIG. 2 shows the comparison of oxidative stability for various sulfones as electrolytic solvents on the surface of lithium compositions.

Figure 3:
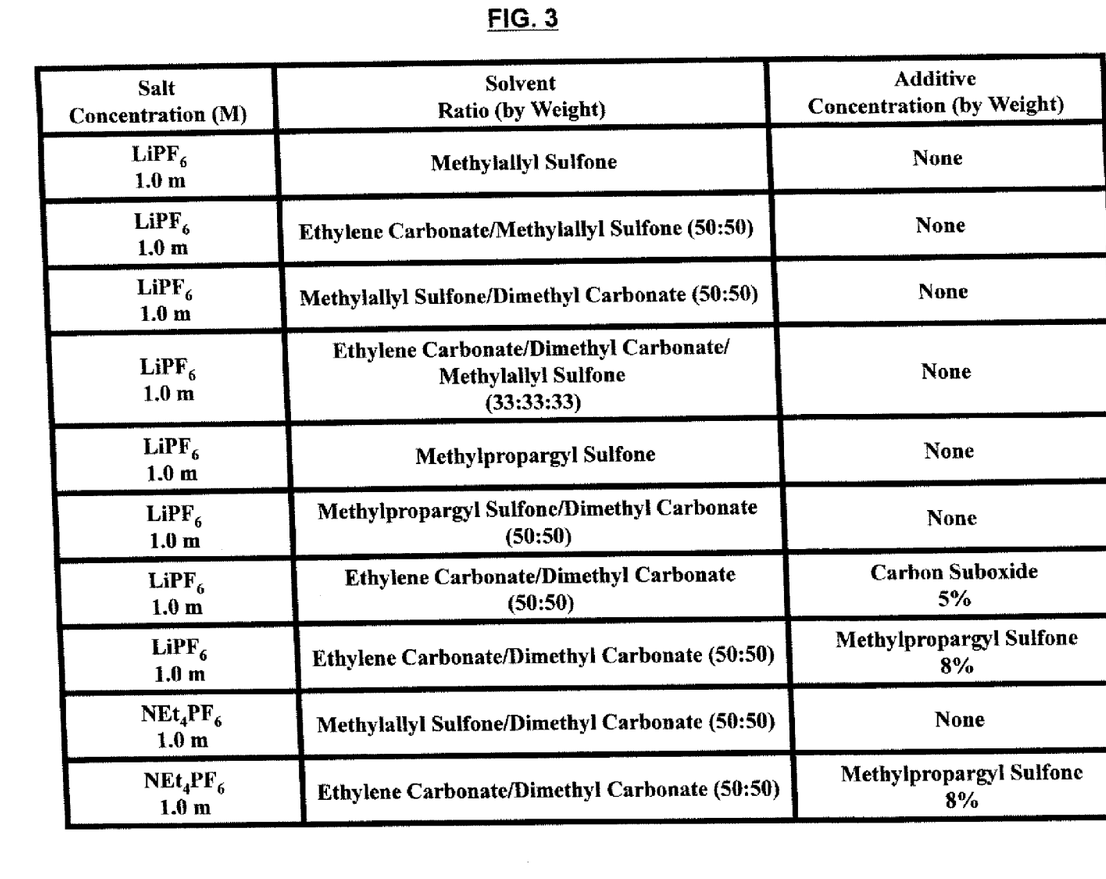
FIG. 3 is a table summarizing selected electrolyte solutions formulated by using the solvents and additives according to the embodiments herein.

FIG. 3 lists some typical electrolyte solutions prepared and tested. It should be noted that the compositions disclosed in FIG. 3 are merely examples of compositions which can be used for the respective electrochemical devices, and they are not intended to limit the scope of the embodiments herein.

EXAMPLE 12

Fabrication of a Lithium Ion Cell

This example summarizes the general procedure of the assembly of a lithium ion cell. A piece of Celgard® polypropylene separator (available from Celgard, LLC, North Carolina, USA) is sandwiched between an anode composite film that is based on graphitic carbon and coated on copper foil, and a cathode composite film that is based on either lithiated transition metal oxides, lithiated metalphosphate or mixture thereof and that is coated on aluminum foil. The lithium ion cell is then activated by soaking the separator with the electrolyte solutions as prepared in Example 11, and sealed with appropriate means.

EXAMPLE 13

Fabrication of a Dual Ion Intercalation Cell

This example summarizes the general procedure of the assembly of dual ion intercalation cells. A piece of Celgard® polypropylene separator (available from Celgard, LLC, North Carolina, USA) is sandwiched between an anode composite film that is based on graphitic carbon coated on copper foil, and a cathode composite film that is also based on graphitic carbon but coated on aluminum foil. The lithium ion cell is then activated by soaking the separator with the electrolyte solutions as prepared in Example 11, and sealed with appropriate means.

EXAMPLE 14

Fabrication of an Electrochemical Capacitor

This example summarizes the general procedure of the assembly of electrochemical double layer capacitors. A piece of Celgard® polypropylene separator (available from Celgard, LLC, North Carolina, USA) is sandwiched between a pair of composite electrodes based on activated carbon materials and coated on various metal current collectors. The separator is then activated with the electrolyte solutions as prepared in Example 11, and sealed with appropriate means.

EXAMPLE 15

Testing of the Electrochemical Cells

This example summarizes the general procedure of testing the electrochemical devices assembled in Examples 12 through 15. The half-cells of lithium ion anode and cathode are subject to both voltammetric and galvanostatic cyclings, and the full lithium ion cells, dual intercalation cells and electrochemical double layer capacitors are subject to galvanostatic cyclings followed by potentiostatic floating. Standard potentiostat/galvanostat and battery testers are employed. As an example for the purpose of illustration, the galvanostic cycling results of anode half-cells in a few selected electrolytes are shown in FIG. 3.

Figure 4A:
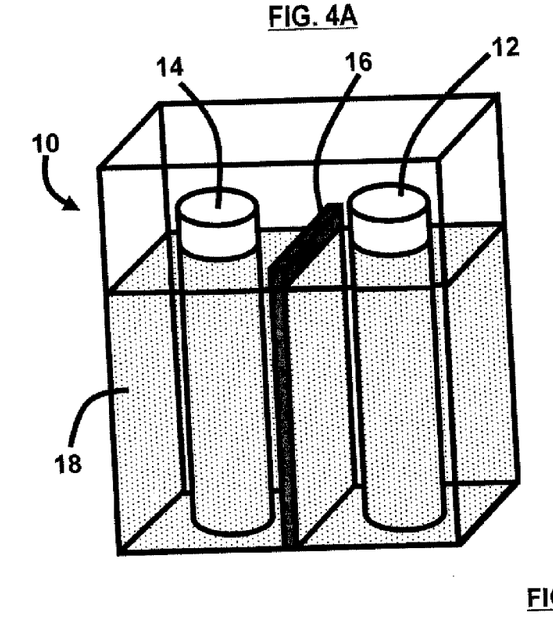
FIG. 4A is a perspective view of an electrochemical device according to the embodiments herein.
Figure 4B:
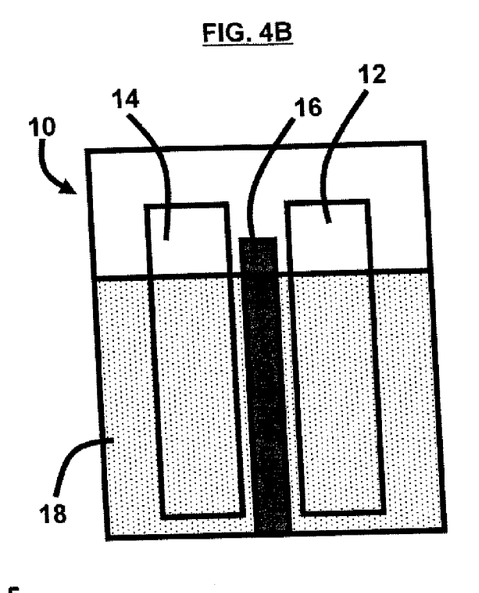
FIG. 4B is a front view of the electrochemical device of FIG. 4A according to the embodiments herein.

FIGS. 4A and 4B illustrate a schematic diagram of an electrochemical device 10 having a negative electrode 12 comprising any of a metal and an electrode active material that reversibly intercalates and de-intercalates cations; a positive electrode 14 of an electrode active material that reversibly intercalates and de-intercalates any of cations and anions; a barrier 16 comprising any of a porous polyolefin separator and a gellable polymer film separating the negative electrode 12 from the positive electrode 14; and a nonaqueous electrolyte 18 contacting the negative electrode 12 and the positive electrode 14, the nonaqueous electrolyte 18 comprising at least one unsaturated molecule acting as any of a solvent and an additive and comprising any of the structures (1) through (8) (corresponding to FIGS. 1A through 1H, respectively).

Figure 5:
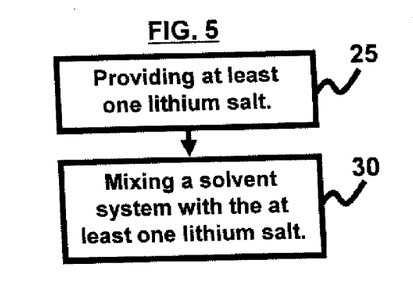
FIG. 5 is a flow diagram illustrating a method according to the embodiments herein.

FIG. 5, with reference to FIGS. 1A through 4B, is a flow diagram illustrating a method of forming an electrolyte solution 18, wherein the method comprises providing (25) at least one lithium salt; and mixing (30) a solvent system with the at least one lithium salt, the solvent system comprising a plurality of polar and aprotic organic molecules comprising at least one unsaturated functionality per molecule that is conjugated with a polar functionality of the molecule, wherein at least one unsaturated functionality comprises any of a double bond and a triple bond between any of a carbon-carbon chain, a carbon-heteroatom chain, and a hetroatom-heteroatom chain; at least one cyclic carbonic diester; and at least one acyclic carbonic diester. Preferably, the solvent system comprises any of the structures (1) through (8) corresponding to FIGS. 1A through 1H, respectively.

In FIGS. 1A through 1H, i, j, and k are integers independent from each other and range from 0 to 1, and l, m, and n are integers independent from each other and range from 0 to 2, respectively, and $R^{1-3}$ have saturated substituents comprising any of hydrogen, C1-C10 normal or C3-C10 branched alkyls, halogen radicals, alkoxyls, thioalkoxyls, aromatic radicals, and unsaturated substituents of any of the radicals in the structures (9) through (11) corresponding to FIGS. 1I through 1K, respectively. In FIGS. 1I through 1K, $R^{4-6}$ are selected from any of H radical, C1-C10 normal or C3-C10 branched alkyls, halogen radicals, alkoxyls, thioalkoxyls, and aromatic radicals.

Preferably, the solvent system comprises any of (i) a neat solvent with at least one additive, (ii) a neat solvent without an additive, (iii) a mixture of at least two solvents with at least one additive, and (iv) a mixture of at least two solvents without an additive. Furthermore, an electrolyte solution may be formed by the mixing of the solvent system with at least one lithium salt; and the electrolyte solution formed may contain any of methylallyl sulfone, methylallyl sulfonate, methylpropargyl sulfone, methylallenic sulfone, methylacetylenic sulfone, methylpropargyl sulfonate, methylacetylenic carbonate, acetylenic butyrate, thiophene-1-oxide, and carbon suboxide.

The lithium salt may comprise any of lithium hexafluorophosphate, lithium fluoro(perfluoroalkyl)phosphate, lithium tetrafluoroborate, lithium hexafluoroarsenate, lithium perchlorate, lithium tetrahloaluminate, lithium tris(trifluoromethanesulfonyl)methide, lithium perfluoroalkylsulfonate, lithium arylsulfonate, lithium bis(oxalato)borate, lithium difluoro(oxalato)borate, and mixtures thereof.

The embodiments herein relate to new polar and aprotic organic molecules that, when serving as solvents in the non-aqueous electrolytes, can form desirable interfaces with both the cathode and anode of an electrochemical cell, while presenting little electrical resistance. The electrochemical cells based on these new electrolyte solvents and additives can afford both high stability and faster kinetics in the cell chemistry.

Examples of high voltage electrochemical devices which may utilize the embodiments herein include, but are not limited to, high energy density or high power density batteries, high power density double-layer capacitors, or electrolysis cells operating at extreme potentials. More particularly, the electrochemical devices that can benefit from utilizing the embodiments herein include, but are not limited to, rechargeable batteries based on lithium metal, lithium-based alloys or lithium ion-intercalatable materials as anode, lithium ion-intercalatable materials as cathode, and non-aqueous solution of lithium salt in mixed electrolyte solvents. The solvents and additives provided by the embodiments herein can also be used in other electrochemical devices such as ultracapacitors, electrolytic cells, and electroplating cells.

The solvents and additives provided by the embodiments herein offer enhanced performance and safety for Li-metal and Li ion cells, double layer capacitors, and electrolysis cells by manipulating the chemical composition of the passivating films through the use of the new solvents/additives. The solvents and additive structures are configured such that the lowest unoccupied molecular orbital (LUMO) energy level is far above the rest of the electrolyte components. As a result, the electrode passivating film in the electrochemical cells utilizing such solvents/additives is dictated by the polymerization chemistry of these solvents/additives, yielding dense, protective yet conductive passivation films. Accordingly, these new solvents and additives are useful in a wide spectrum of electrochemical devices whose operation relies on the wide stability window of the electrolytes.

The solvents and additives provided by the embodiments herein are configured to be oxidized or reduced prior to the rest of the electrolyte components, and their unsaturated functionalities render an electrode surface film that is of polymeric nature. Therefore, Li ion cells utilizing such solvents and additives are better protected and also exhibit improved performances.

The structure of the solvents and additives provided by the embodiments herein offers tailored surface chemistry on electrodes so that the operation of electrochemical cells can be better controlled. In this regard, the solvents or additives provided by the embodiments herein are unsaturated so that their decomposition products are likely to be polymeric, which protect the electrode surfaces more efficiently; and their unsaturated functionalities are preferably in conjugation with the polar group, so that their LUMO energy level is low, which makes them the dominant species in passivating film chemistry.

The embodiments herein provide a series of unsaturated polar organic compounds that can be used as either solvents or additives in non-aqueous electrolytes. The decomposition potentials of these compounds are controlled by the location of the unsaturated bonds relative to the polar group, and the resultant decomposition compounds of polymeric nature are expected to offer better protections to the electrodes while minimizing the resistance. Such an electrochemical device provides an optimized stabilization.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An electrochemical device comprising:
   a negative electrode comprising a metal or an electrode active material that reversibly intercalates and de-intercalates cations;
   a positive electrode comprising an electrode active material that reversibly intercalates and de-intercalates cations or anions;
   a barrier comprising a porous polyolefin separator or a gellable polymer film separating said negative electrode from said positive electrode; and
   a nonaqueous electrolyte contacting said negative electrode and said positive electrode, said nonaqueous electrolyte comprising at least one unsaturated molecule acting as a solvent or an additive and comprising the following structure (1) or structure (2):

wherein $R^{1-3}$ are saturated substituents selected from the group consisting of hydrogen, C1-C10 normal alkyls, C3-C10 branched alkyls, halogen radicals, alkoxyls, thioalkoxyls, and aromatic radicals, or unsaturated substituents selected from the radicals in the following structures (9) through (11):

wherein $R^{4-6}$ are selected from the group consisting of hydrogen, C1-C10 normal alkyls, C3-C10 branched alkyls, halogen radicals, alkoxyls, thioalkoxyls, and aromatic radicals;

wherein said unsaturated molecule comprises at least one unsaturated substituent selected from the group consisting of structure (9), structure (10) and structure (11);

wherein X is carbonyl, thionyl, or sulfonyl;

wherein Y is phosphinyl or phosphoryl;

wherein i, j, and k are integers independent from each other and range from 0 to 1;

wherein l, m, and n are integers independent from each other and range from 0 to 2, respectively; and wherein q is 1 or 2 when $R^1$ is the unsaturated substituent having the structure (9), and wherein q is an integer and ranges from 0 to 2 when $R^1$ is a saturated substituent or an unsaturated substituent having the structure (10) or (11); and wherein r is 1 or 2 when $R^2$ is the unsaturated substituent having the structure (9), and wherein r is an integer and ranges from 0 to 2 when $R^2$ is a saturated substituent or an unsaturated substituent having the structure (10) or (11); and wherein said nonaqueous electrolyte comprises at least one said unsaturated molecule of structures (1) or (2), wherein X is sulfonyl and Y is phosphoryl, and wherein i, j, k, l, m, and n equal zero.

2. The electrochemical device of claim 1, wherein said nonaqueous electrolyte comprises at least one unsaturated molecule selected from structures (1) or (2), and wherein at least one of l, m, or n equals zero.

3. The electrochemical device of claim 1, wherein said nonaqueous electrolyte comprises an unsaturated molecule of structure (1), wherein X is sulfonyl.

4. The electrochemical device of claim 3, wherein said unsaturated sulfone is selected from the group consisting of methyl allyl sulfone, methyl propargyl sulfone, methyl allenic sulfone and methylacetylenic sulfone.

5. The electrochemical device of claim 1, wherein said at least one unsaturated molecule in said nonaqueous electrolyte acts as a solvent.

6. The electrochemical device of claim 1, wherein said nonaqueous electrolyte comprises a co-solvent containing a cyclic carbonate, an acyclic carbonate, a carboxylic ester, ethylene carbonate, propylene carbonate, vinyl carbonate, dimethyl carbonate, diethyl carbonate, ethylmethyl carbonate, γ-butyrolactone, methyl butyrate, ethyl butyrate, or mixtures thereof.

7. The electrochemical device of claim 1, wherein said nonaqueous electrolyte comprises a cosolvent in mixture with at least one of the molecules of structure (1) or structure (2) as a co-solvent or an additive.

8. The electrochemical device of claim 1, wherein said nonaqueous electrolyte comprises a lithium salt selected from the group consisting of lithium hexafluorophosphate, lithium fluoro(perfluoroalkyl)phosphate, lithium tetrafluroborate, lithium hexafluroarsenate, lithium perchlorate, lithium tetrahaloaluminate, lithium tris(trifluoromethanesulfonyl)methide, lithium perfluoroalkylsulfonate, lithium arylsulfonate, lithium bis(oxalato)borate, lithium difluoro(oxalato)borate, lithium perfluoroalkylfluoroborate, lithium bis(trifluoromethanesulfonyl)imide, lithium bis(perfluoroethanesulfonyl)imide, and mixtures thereof.

9. The electrochemical device of claim 8, wherein a concentration of said solvent ranges from approximately 10% to 100% with respect to a total solvent weight, wherein a concentration of said additive ranges from approximately 0.005% to 10% with respect to said total solvent weight, and wherein a concentration of said lithium salt ranges from approximately 0.5 to 3.0 mole/liter.

10. The electrochemical device of claim 1, wherein the electrode active material of said negative electrode comprises lithium metal, lithium alloy with other metals, carbonaceous materials with various degree of graphitization, lithiated metal oxides, or chalcogenides.

11. The electrochemical device of claim 1, wherein the electrode active material of said positive electrode comprises transition metal oxides, metalphosphates, chalcogenides, or carbonaceous materials with various degree of graphitization.

12. A nonaqueous electrolyte solution comprising:
at least one lithium salt; and
a solvent system mixed with said at least one lithium salt, said solvent system comprising:
at least one polar and aprotic organic molecule acting as a solvent or additive, said polar and aprotic organic molecule comprising at least one unsaturated functionality per molecule conjugated with a polar functionality of said molecule, wherein said at least one unsaturated functionality comprises a double bond or a triple bond between a carbon-carbon chain, a carbon-heteroatom chain, or a hetroatom-heteroatom chain;
at least one cyclic carbonic diester; and
at least one acyclic carbonic diester;
wherein said polar and aprotic organic molecule is an unsaturated molecule comprising the following structure (1) or structure (2):

$$R^1 \text{---} (CH_2)_q \text{---} X \text{---} (CH_2)_r \text{---} R^2 \quad (1)$$

$$R^1 \text{---} \left( \overset{H_2}{C} \right)_l \text{---} (O)_i \text{---} Y \text{---} (O)_k \text{---} \left( \overset{H_2}{C} \right)_n \text{---} R^3 \quad (2)$$
$$\underset{\underset{R^2}{|}}{\underset{(CH_2)_m}{|}} \underset{(O)_j}{|}$$

wherein $R^{1-3}$ are saturated substituents selected from the group consisting of hydrogen, C1-C10 normal alkyls, C3-C10 branched alkyls, halogen radicals, alkoxyls, thioalkoxyls, and aromatic radicals, or unsaturated substituents selected from the radicals in the following structures (9) through (11):

$$\underset{R^4}{\overset{}{\diagdown}} C = C \underset{R^6}{\overset{R^5}{\diagup}} \quad (9)$$

$$\text{---} C \equiv C \text{---} R^4 \quad (10)$$

$$\underset{R^4}{\overset{}{\diagdown}} C = C = C \underset{R^6}{\overset{R^5}{\diagup}} \quad (11)$$

wherein $R^{4-6}$ are selected from the group consisting of hydrogen, C1-C10 normal alkyls, C3-C10 branched alkyls, halogen radicals, alkoxyls, thioalkoxyls, and aromatic radicals;

wherein said unsaturated molecule comprises at least one unsaturated substituent selected from the group consisting of structure (9), structure (10) and structure (11);

wherein X is carbonyl, thionyl, or sulfonyl;

wherein Y is phosphinyl or phosphoryl;

wherein i, j, and k are integers independent from each other and range from 0 to 1;

wherein l, m, and n are integers independent from each other and range from 0 to 2, respectively; and wherein q is 1 or 2 when $R^1$ is the unsaturated substituent having the structure (9), and wherein q is an integer and ranges from 0 to 2 when $R^1$ is a saturated substituent or an unsaturated substituent having the structure (10) or (11); and wherein r is 1 or 2 when $R^2$ is the unsaturated substituent having the structure (9), and wherein r is an integer and ranges from 0 to 2 when $R^2$ is a saturated substituent or an unsaturated substituent having the structure (10) or (11); and wherein said solvent system comprises at least one said unsaturated molecule of structure (1) or structure (2), wherein X is sulfonyl and Y is phosphoryl, and wherein i, j, k, l, m and n equal zero.

13. The nonaqueous electrolyte solution of claim 12, wherein said solvent system comprises (i) a neat solvent with at least one additive, (ii) a neat solvent without an additive, (iii) a mixture of at least two solvents with at least one additive, or (iv) a mixture of at least two solvents without an additive.

14. The electrolyte solution of claim 12, wherein said unsaturated molecule is selected from the group consisting of methylallyl sulfone, methylpropargyl sulfone, methylallenic sulfone, methylacetylenic sulfone, and thiophene-1-oxide.

15. The nonaqueous electrolyte solution of claim 12, wherein said solvent system comprises at least one unsaturated molecule selected from structures (1) or (2), and wherein at least one of l, m, or n equals zero.

16. The nonaqueous electrolyte solution of claim 12, wherein said solvent system comprises an unsaturated molecule of structure (1), wherein X is sulfonyl.

17. The nonaqueous electrolyte solution of claim 16, wherein said unsaturated sulfone is selected from the group consisting of methyl allyl sulfone, methyl propargyl sulfone, methyl allenic sulfone and methylacetylenic sulfone.

18. The nonaqueous electrolyte solution of claim 12, wherein said lithium salt is selected from the group consisting of lithium hexafluorophosphate, lithium fluoro(perfluoroalkyl) phosphate, lithium tetrafluoroborate, lithium hexafluoroarsenate, lithium perchlorate, lithium tetrahaloaluminate, lithium tris(trifluoromethanesulfonyl)methide, lithium perfluoroalkylsulfonate, lithium arylsulfonate, lithium bis(oxalato)borate, lithium (difluorooxalato) borate, lithium perfluoroalkylfluoroborate, lithium bis(trifluoromethanesulfonyl) imide, lithium bis(perfluoroethanesulfonyl)imide, and mixtures thereof.

19. The nonaqueous electrolyte solution of claim 12, wherein the concentration of said lithium salt ranges from approximately 0.5 to 3.0 mole/liter.

20. The nonaqueous electrolyte solution of claim 12, wherein said at least one unsaturated molecule is present therein as a solvent or co-solvent, wherein the concentration of said at least one unsaturated molecule ranges from approximately 10% to 100% with respect to a total solvent weight.

21. The nonaqueous electrolyte solution of claim 12, wherein said at least one unsaturated molecule is present therein as a solvent or co-solvent, wherein the concentration of said at least one unsaturated molecule ranges from approximately 33% to 100% with respect to a total solvent weight.

22. The nonaqueous electrolyte solution of claim 12, wherein said at least one unsaturated molecule is present therein as an additive, wherein the concentration of said additive ranges from approximately 0.005% to 10% with respect to said total solvent weight.

23. The nonaqueous electrolyte solution of claim 12, wherein said at least one cyclic carbonic diester is selected from the group consisting of ethylene carbonate, propylene carbonate, and vinyl carbonate.

24. The electrolyte solution of claim 12, wherein said at least one acyclic carbonic diester is selected from the group consisting of dimethyl carbonate, diethyl carbonate, and ethylmethylcarbonate.

25. A method of forming an electrolyte solution, said method comprising:
providing at least one lithium salt; and
mixing a solvent system with said at least one lithium salt, said solvent system comprising:
at least one polar and aprotic organic molecule acting as a solvent or additive, said polar and aprotic organic molecule comprising at least one unsaturated functionality per molecule that is conjugated with a polar functionality of said molecule, wherein said at least one unsaturated functionality comprises a double bond or a triple bond between a carbon-carbon chain, a carbon-heteroatom chain, or a hetroatom-heteroatom chain;
at least one cyclic carbonic diester; and
at least one acyclic carbonic diester;
wherein said polar and aprotic organic molecule is an unsaturated molecule selected from the group consisting of methylallyl sulfone, methylpropargyl sulfone, methylallenic sulfone, methylacetylenic sulfone, and thiophene-1-oxide.

26. The method of claim 25, wherein said solvent system comprises (i) a neat solvent with at least one additive, (ii) a neat solvent without an additive, (iii) a mixture of at least two solvents with at least one additive, or (iv) a mixture of at least two solvents without an additive.

* * * * *